(12) United States Patent
Terpsma et al.

(10) Patent No.: US 7,431,321 B2
(45) Date of Patent: Oct. 7, 2008

(54) TRAILER HITCH ASSEMBLY

(75) Inventors: Eric M. Terpsma, Holland, MI (US); David O. Roe, Grand Haven, MI (US); Richard T. Polanic, Hudsonville, MI (US); Rudolph A. Bahnsen, Zeeland, MI (US)

(73) Assignee: SAF-Holland, Inc., Holland, MI (US)

( * ) Notice: Subject to any disclaimer, the term of this patent is extended or adjusted under 35 U.S.C. 154(b) by 455 days.

(21) Appl. No.: 10/855,108

(22) Filed: May 27, 2004

(65) Prior Publication Data

US 2004/0239077 A1 Dec. 2, 2004

Related U.S. Application Data

(60) Provisional application No. 60/473,652, filed on May 28, 2003.

(51) Int. Cl.
*B60D 1/04* (2006.01)
*B60D 1/00* (2006.01)

(52) U.S. Cl. .................... 280/514; 280/504; 280/491.2; 280/491.5; 280/414.1; 285/187; 285/231; 285/906; 285/917; 285/223; 285/913; 285/910; 285/233; 285/234; 285/351; 138/145; 138/146; 277/585

(58) Field of Classification Search .................. 280/514, 280/504, 491.2, 491.5, 414.1; 285/187, 231, 285/906, 917, 223, 913, 910, 233, 234, 351; 138/145, 146; 277/585
See application file for complete search history.

(56) References Cited

U.S. PATENT DOCUMENTS 1,680,236 A * 8/1928 Zimmerman ................ 280/492
2,342,647 A * 2/1944 Denman ..................... 277/585
2,426,532 A * 8/1947 Tierney ....................... 280/504
2,431,694 A * 12/1947 Johnson ...................... 280/504
2,671,674 A * 3/1954 Derksen ................... 280/491.2
2,685,468 A * 8/1954 Blocker et al. .............. 403/350
2,766,995 A * 10/1956 Weiss ......................... 280/504

(Continued)

FOREIGN PATENT DOCUMENTS

JP          63097410 A   *  4/1988

(Continued)

*Primary Examiner*—Lesley D Morris
*Assistant Examiner*—Marlon Arce-Diaz
(74) *Attorney, Agent, or Firm*—Price, Heneveld, Cooper, DeWitt & Litton, LLP (57) ABSTRACT

A trailer hitch assembly includes a receiver portion including a cylindrically-shaped cavity, a bushing member received within the cavity of the receiver portion, and a hitch member that includes a shaft pivotally received within the bushing member. At least a selected one of the bushing member and the shaft is constructed of a material that substantially eliminates the need for using a separately applied lubricant during use of the trailer hitch assembly. The hitch member also includes a first jaw member, a second jaw member coupled to the first jaw member and operable between open and closed positions, a primary latch coupled with the second jaw member and operable between a locked position preventing opening of the second jaw member, and an unlocked position allowing opening of the second jaw member, and a secondary latch coupled with the primary latch and operable between a locked position preventing unlocking of the primary latch, and an unlocked position, wherein the primary latch may be moved to the unlocked position thereof.

37 Claims, 4 Drawing Sheets

U.S. PATENT DOCUMENTS

| | | | |
|---|---|---|---|
| 2,842,380 A * | 7/1958 | Weiss | 280/504 |
| 2,871,030 A * | 1/1959 | Hollis | 280/492 |
| 3,132,868 A * | 5/1964 | Kolthoff, Jr. et al. | 277/585 |
| 3,490,790 A * | 1/1970 | Kees | 280/508 |
| 4,588,199 A * | 5/1986 | Fisher | 280/204 |
| 4,711,461 A * | 12/1987 | Fromberg | 280/494 |
| 4,721,324 A * | 1/1988 | Blacklaw | 280/504 |
| 4,958,848 A * | 9/1990 | Nash | 280/509 |
| 5,332,250 A * | 7/1994 | Thorwall et al. | 280/507 |
| 5,524,914 A * | 6/1996 | Doherty et al. | 280/24 |
| 5,571,341 A * | 11/1996 | Jackel | 148/210 |
| 5,685,554 A * | 11/1997 | Poxleitner | 280/491.2 |
| 5,713,698 A * | 2/1998 | Worsley | 405/60.5 |
| 5,851,021 A * | 12/1998 | Van Kley | 280/438.1 |
| 6,932,373 B2 * | 8/2005 | Seebohm et al. | 280/442 |
| 2002/0005223 A1 * | 1/2002 | Campagna et al. | 138/146 |

FOREIGN PATENT DOCUMENTS

| | | | |
|---|---|---|---|
| JP | 07276937 A | * | 10/1995 |
| JP | 20010173438 A | * | 3/2001 |

\* cited by examiner

TRAILER HITCH ASSEMBLY

CROSS REFERENCE TO RELATED APPLICATION

This application claims the benefit of U.S. Provisional Application No. 60/473,652, filed May 28, 2003, entitled TRAILER HITCH ASSEMBLY, which is hereby incorporated herein by reference in its entirety.

BACKGROUND OF THE INVENTION

The present invention relates to a trailer hitch assembly, and more particularly relates to a no-lube assembly and further to a primary and secondary latching arrangement for a pintle hook.

Hitching assemblies are used in a wide variety of vehicle towing operations and applications, and are provided in a significant number of configurations and orientations. These hitch assemblies typically include a first portion connected to a towing vehicle, and a second section operably coupled to the first section and adapted to couple with a towed vehicle. Heretofore, the couple between the first and second portions of these hitch assemblies have been open to contamination by contaminants such as dirt and liquids entering the couple therebetween, and thereby leading to rapid degradation of the associated components. Further, this contamination of debris within the couple can also restrict free movement of the couple over its operable range. Moreover, the degradation of the associated components may lead to complete failure of the hitch assembly via rust, corrosion, and the like.

A hitching assembly is required that reduces and/or eliminates the entry of debris into the hitch assembly, reduces the wear between the associated components, and provides for a long operating life without the requirement of significant maintenance thereto.

Figure 1:
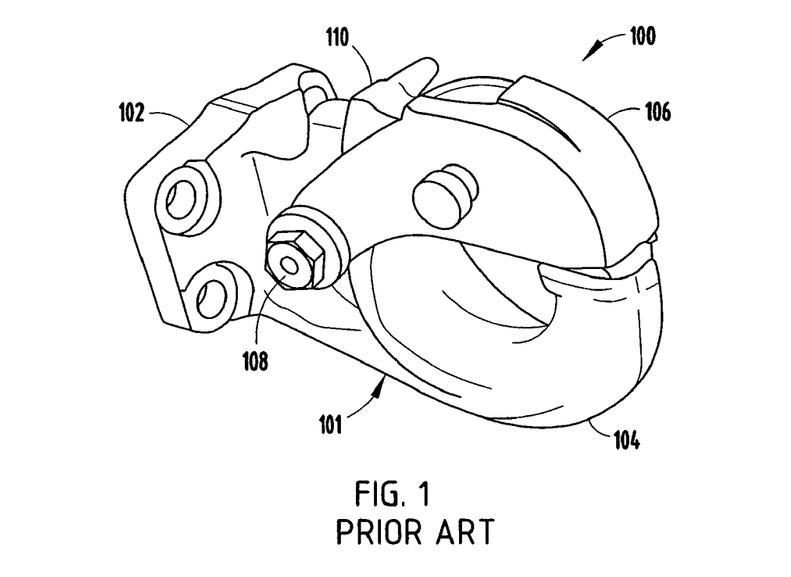
FIG. 1 is a top and rear perspective view of a prior art pintle hook.
Figure 2:
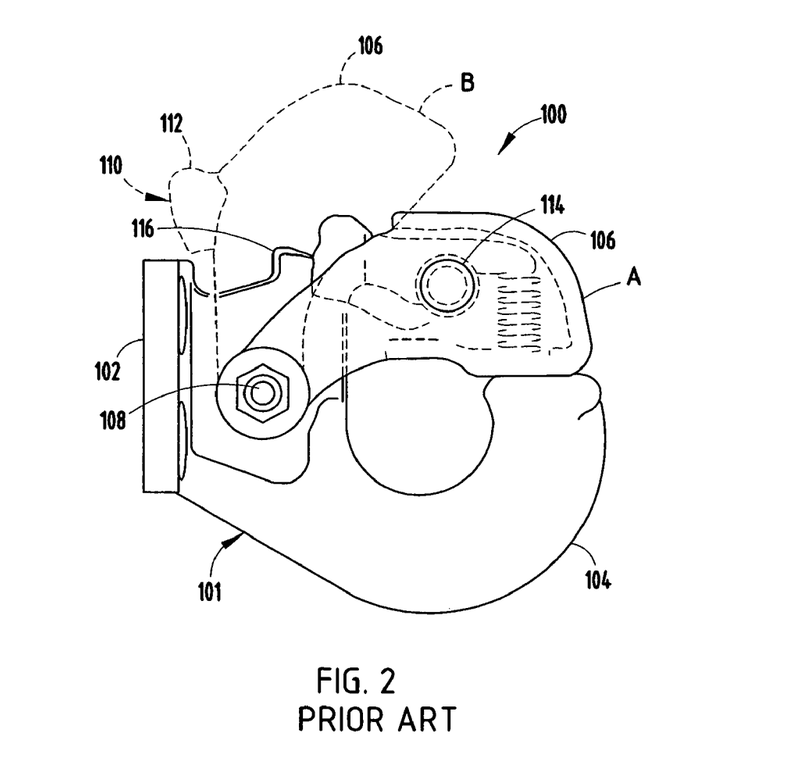
FIG. 2 is a side view of the prior art pintle hook with a locking jaw of the pintle hook shown in a closed position in solid lines, and an open position in dashed lines, and with internal components of the locking jaw shown in dashed lines.

One configuration of hitch assemblies is the conventional pintle hook that is used in various towing vehicles, such as trucks, land moving equipment, and agricultural equipment for hitching the towing vehicle to a trailer. An example of a conventional pintle hook construction is shown in FIG. 1. As shown, the pintle hook 100 includes a main body 101 having an integral base plate 102 and an integral lower jaw hook 104. An upper jaw latch 106 is pivotally attached to the body 101 by a pivot pin 108. As shown in FIG. 2, the upper jaw latch 106 may be pivoted upward from a closed position A to an open position B, where the pintle hook can receive a draw bar eye, or other coupling structure, that would be attached to the associated trailer. The upper jaw latch 106 would then resume the closed position A and a locking mechanism 110 would lock the upper jaw into position A. The locking mechanism 110 typically includes a locking tab 112 that is pivotally attached to the upper jaw latch 106 via a pivot bolt 114 and is pivotable between an engaged position, wherein the locking tab 112 engages a tab 116 integrally formed with the body 101, and a disengaged position, wherein the tab 112 is rotated upwardly to pass above the tab 116. Heretofore, numerous fasteners have been utilized for the purposes of locking pintle hooks in the closed position, such as device pins, positive locking pins, detent nylon and cable lanyards, wire lock pins, as well as tab lock pins. These fasteners utilized in hitching assemblies have proven difficult to remove by requiring the use of both hands to unlatch the pintle hook, are similarly difficult and inefficient during installation, are at times unable to meet shearing load requirements as exerted thereon, are costly to manufacture, and can be easily misplaced and lost.

Accordingly, a hitch assembly is needed that allows for easy operation of the associated pintle hook, while providing sufficient engagement to meet safety requirements associated therewith.

SUMMARY OF THE INVENTION

One aspect of the present invention is to provide a trailer hitch assembly that includes a receiver portion adapted to operably couple with a towing vehicle and including a cylindrically-shaped cavity, and cylindrically-shaped bushing member received within the cavity of the receiver portion. The trailer hitch assembly also includes a hitch portion adapted to operably couple with a towed vehicle, and including a cylindrically-shaped shaft pivotally received within the bushing member, wherein at least a selected one of the bushing member and the shaft at least in part comprises a material that substantially eliminates the need for using a separately applied lubricant during use of the trailer hitch assembly.

Another aspect of the present invention is to provide a trailer hitch assembly that includes a receiver portion adapted to be operably coupled with a towing vehicle, and a hitch portion adapted to be operably coupled with the receiver portion. The hitch portion includes a first jaw member, and a second jaw member pivotally coupled to the first jaw member, the second jaw member being operable between a closed position, wherein the second jaw member cooperates with the first jaw member to form a closed loop, and an open position, wherein the first and second jaw member form an open loop. The hitch portion also includes a primary latch operably coupled with a select one of the first and second jaw members operable between a locked position, wherein the primary latch abuts a select one of the first and second jaw members not operably coupled with the primary latch and prevents the second jaw member from pivoting to the opened position, and an unlocked position, wherein the second jaw member is able to pivot to the open position. The hitch portion further includes a secondary latch operably coupled with the primary latch and operable between a locked position, wherein the secondary latch abuts a select one of the first and second jaw members and prevents the primary latch from being pivoted to the unlocked position, and a unlocked position, wherein the primary latch is able to pivot to the unlocked position thereof.

DETAILED DESCRIPTION OF THE PREFERRED EMBODIMENTS

Figure 3:
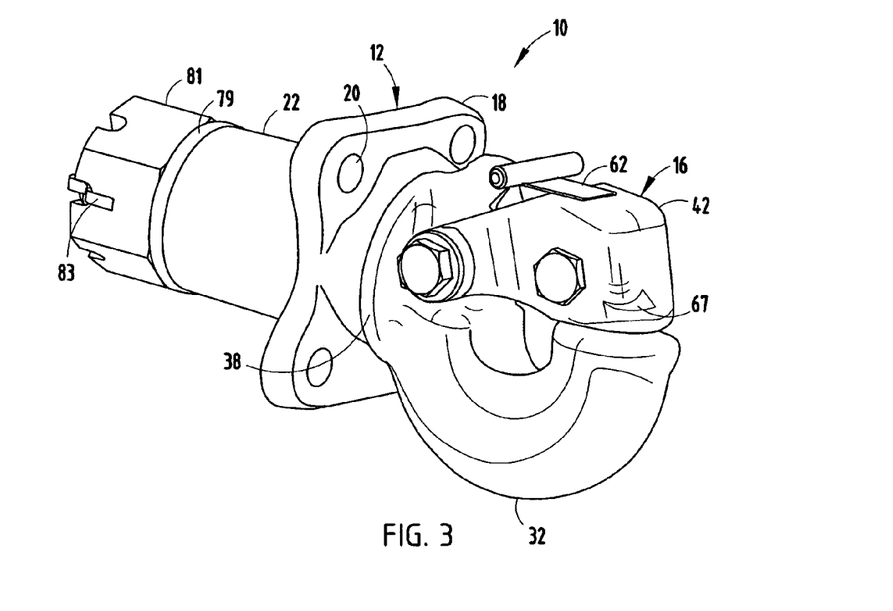
FIG. 3 is a top and rear perspective view of the trailer hitch assembly embodying the present invention.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 4:
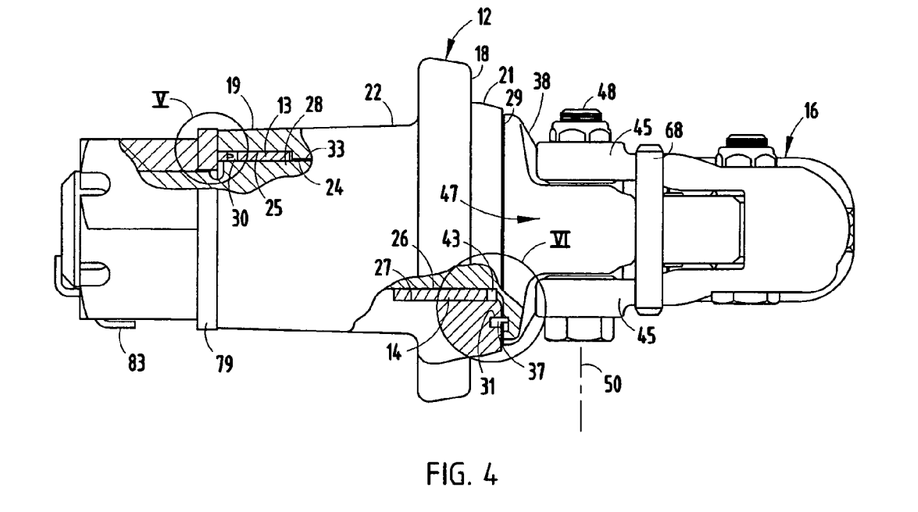
FIG. 4 is a top view of the trailer hitch assembly in a closed position, and with a portion cut-away to show a bushing arrangement.
Figure 5:
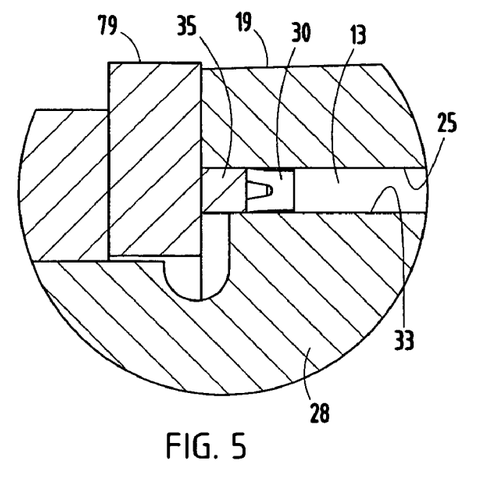
FIG. 5 is an enlarged, cross-sectional side view of area V, FIG. 4.
Figure 6:
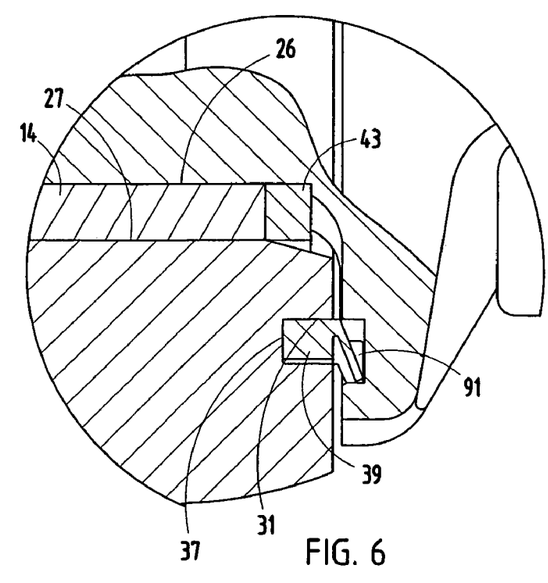
FIG. 6 is an enlarged, cross-sectional side view of area VI, FIG. 4.

The reference numeral 10 (FIG. 3) generally designates a trailer hitch assembly embodying the present invention. In the illustrated example, the trailer hitch assembly 10 includes a receiver portion 12, a forward bushing member 13 (FIG. 4), a rearward bushing member 14, and a hitch portion 16.

The receiver portion 12 includes a generally square-shaped mounting plate 18 having a plurality of apertures 20 located proximate the corners thereof. The apertures 20 are adapted to received mounting hardware (not shown) for mounting the trailer hitch assembly 10 to a structural component of an associated towing vehicle. The receiver portion 12 also includes a cylindrically-shaped receiving tube 22 integrally formed with the mounting plate 18 having a forward portion 19 and extending forwardly from the mounting plate 18 and a rearward portion 21 extending rearwardly from the mounting plate 18. The tube 22 includes a longitudinally-extending cylindrically-shaped cavity or bore 24, having a first counter bore 25 and a second counter bore 27.

The forward and rearward bushing members 13, 14 are each cylindrically-shaped and are tightly received within the counter bore 25 and the counter bore 27, respectively. The bushing members 13, 14 are each constructed of a material that is highly resistant to frictional wear, such as self-lubricating composite material, preferably a reinforced composite, such as a strong, waxy, nonflammable resin belonging to the family of organic polymers, such as TEFLON® additive, as available from Dupont of Wilmington, Del. Further, the bore 24 and the shaft 28 are treated with or coated with a process to improve corrosion resistance and/or to reduce the friction between that and any abutting component(s), such as a nitrocarbonization process.

The hitch portion 16 includes a cylindrically-shaped shaft 28 that is received within the bushing members 13, 14 and the cavity 24 of the receiver portion 12, such that an outer surface 33 of the shaft 28 abuts the bushing surface 26 of each of the bushing members 13, 14. A U-cup shaped flexible seal member 30 surrounds and abuts the shaft 28 and is received with the counter bore 25 of the cavity 24 such that the seal member 30 abuts the forward bushing member 13 and the counter bore 25. A ring-shaped felt washer 35 is received within the counter bore 25 and abuts the seal member 30. A ring-shaped flexible seal member 37 is located within the groove 31 of the receiving tube 22 and includes a body portion 39 and an outwardly-extending, flexibly resilient finger 91. A ring-shaped felt washer 43 is received within the counter bore 27 and abuts the rearward bushing member 14. The seal members 30, 37 are each flexibly resilient, low friction members allowing movement in all six degrees of freedom, and are preferably constructed of a synthetic, wear-resistant material, however other metallic, non-metallic, ceramic and rubber materials such as rubber may be substituted therefore.

Figure 7:
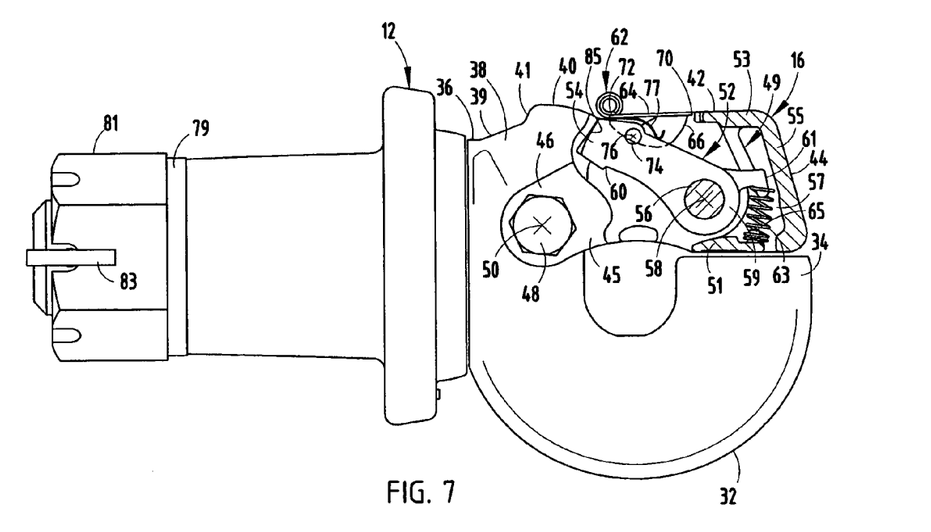
FIG. 7 is a side view of the trailer hitch assembly in the closed position, with a portion cut away to show a primary and secondary latch arrangement.
Figure 8:
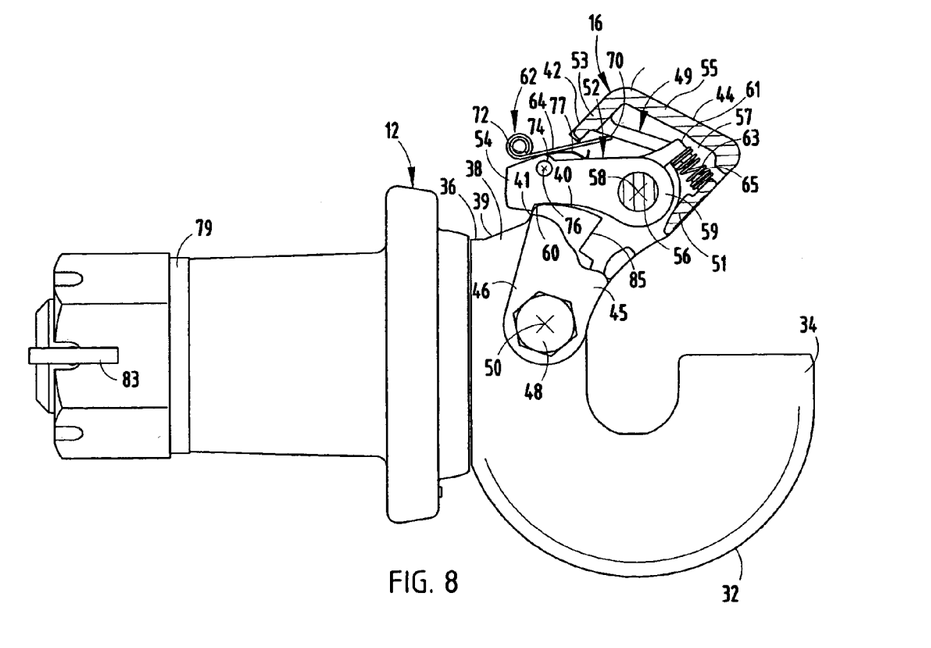
FIG. 8 is side perspective view of the trailer hitch assembly in an open position with a portion cut away to show the primary and secondary latch arrangement.

The hitch portion 16 (FIGS. 7 and 8) also includes a first or lower jaw member 32 having an upwardly-turned distal end 34, and a proximate end 36 that is integrally formed with a plate portion 38 that is in turn integrally formed with the shaft 28. The proximate end 36 of the first jaw member 32 includes a top surface 39 having a raised portion 40, defining an abutment surface 41, and an inner abutment surface 85. The hitch portion 16 further includes a second or upper jaw member 42 having a solid distal end 44 adapted to abut the distal end 34 of the first jaw member 32 as discussed below, and a pair of legs 45 extending towards a proximate end 46 and defining a gap 47 therebetween. The upper jaw member 42 further includes a hollow interior 49 as defined by a bottom wall 51, a top wall 53, a rear wall 55, and a pair of side walls 57. An interior stop wall 85 extends between the side walls 57 within the interior 49. The rear wall 55 includes an outwardly-exposed relief 67. The proximate end 46 of the second jaw member 42 is pivotally connected to the first jaw member 32 via a pivot pin 48 at a first point 50 defined by the longitudinal axis of the pivot pin 48. The second jaw member 42 is pivotable between a closed position, as illustrated in FIG. 7, and an open position, as illustrated in FIG. 8.

The hitch portion 16 further includes a primary latch 52 having a distal end 54, and a proximate end 59 pivotally connected to the second jaw member 42 via a pivot pin 56 at a second point 58 as defined by the longitudinal axis of the pivot pin 56. The primary latch 52 further includes a notch 60 located along the length thereof, and a leg 61 extending rearwardly from the proximate end 59. In the illustrated example, the second pivot point 58 is located rearwardly and upwardly from the first pivot point 50. The primary latch 52 is pivotable between a locked position as shown in FIG. 7, and an unlocked position, as shown in FIG. 8. The primary latch 52 is positively biased in the locked position by a coil spring 63 extending between the leg 61 and the bottom wall 51 of the upper jaw member 42. The coil spring 63 is positively positioned within the hollow interior 49 of the upper jaw member 42 by a stud 65 extending upwardly from the bottom wall 51.

The hitch portion 16 further includes a secondary latch 62 that includes a body portion 64, a pair of downwardly-extending legs 66 opposed across the body portion 64, and a pair of graspable handles 68 also opposed across the body section 64. The body portion 64 includes a forward abutment surface 70. The secondary latch 62 is pivotally connected to the primary latch 52 via a rivet 74 and is pivotable about a third point 76 as defined by an axis extending through the rivet 74. In the illustrated example, the third pivot point 76 is located forwardly and upwardly of the second pivot point 58. The secondary latch 62 is pivotable between a locked position, as shown in FIG. 7 wherein the abutment surface 70 abuts the upper jaw member 42, and an unlocked position, as shown in FIG. 8, that allows the primary latch 52 to pivot from the locked to the unlocked position. A flat spring 77 biases the secondary latch 62 towards the locked position. Specifically, the flat spring 77 is received within a slot 72 located proximate the handles 68, and extends and is biased between the body portion 64 of the secondary latch 62 and the primary latch 52.

In operation, the second jaw member 42 is maintained in the closed position by the primary latch 52, and specifically by the abutment of the distal end 54 of the primary latch 52 with the abutment surface 85 of the first jaw member 32. The primary latch 52 is in turn held in the locked position by the abutment of the secondary latch 62 with the second jaw member 42. To move the second jaw member 42 to the open position, an operator grasps the relief 67 of the second jaw member 42 and the handles 68 and pivots the secondary latch 62 about the pivot point 76 overcoming the biasing force of the flat spring 77, thereby allowing the primary latch 52 to pivot about the pivot point 58 such that the distal end 54 of the primary latch 52 is no longer aligned with the abutment surface 85 of the first jaw member 32. The second jaw member 42 is then pivoted upwardly about the pivot point 50 to the open position. The second jaw member 42 is maintained in the open position and the notch 60 of the primary latch 52 engages the abutment surface 41 as defined by the raised portion 40. The second jaw member 42 is returned to the closed position by rotating the primary latch 52 such that the notch 60 of the primary latch 52 no longer engages the surface 41 of the primary jaw member 32.

To prevent catastrophic failure of the hitch assembly 10 while in use, the pivot pin 56 at the second point 58 is designed to fail prior to the pivot pin 48 when a predetermined excessive force is exerted on the second jaw member 16 in a direction outward from the closed loop. Subsequent to failure of the pivot pin 56, the primary latch 52 is forced rearwardly until the primary latch 52 abuts the interior stop wall 85 of the secondary jaw member 16, thereby preventing the second jaw member 16 from moving to a fully open position.

The hitch portion 16 is coupled with the receiver portion 12 by inserting the shaft 28 into the bore 24, placing a coated washer 79 over the shaft 28, and threadably securing a nut 81 on the end of the shaft 28, thereby securing the washer 79 between the receiver portion 12 and the nut 81. The nut 81 is secured in place about the shaft 28 by a cotter pin 83.

The present inventive trailer hitch assembly reduces and/or eliminates the entry of debris into the hitch assembly, reduces wear on the associated components, and provides for a long operating life. The trailer hitch assembly further allows for easy operation of the associated pintle hook, while providing sufficient engagement to meet safety requirements associated therewith.

These and other advantages of the invention will be further understood and appreciated by those skilled in the art by reference to the following written specification, claims and appended drawings.

The invention claimed is:

1. A trailer hitch assembly, comprising:
   a receiver portion adapted to operably couple with a towing vehicle and including a cylindrically-shaped cavity;
   a cylindrically-shaped bushing member received within the cavity of the receiver portion; and
   a hitch portion adapted to operably couple with a towed vehicle and including a cylindrically-shaped shaft pivotally received within the bushing member, wherein at least a selected one of the bushing member and the shaft at least in part comprises a material that substantially eliminates the need for using a separately applied lubricant during use of the trailer hitch assembly, the bushing members comprise a self-lubricating material; and
   wherein the cavity of the receiver portion is defined in part by an inner wall, and wherein at least a select one of the wall of the cavity and the shaft comprises a corrosion resistant material.

2. The trailer hitch assembly of claim 1, wherein the bushing members comprise a fiber reinforced composite.

3. The trailer hitch assembly of claim 2, wherein the bushing members comprise a low-friction thermoset resin.

4. The trailer hitch assembly of claim 1, wherein at least a select one of the wall of the cavity and the shaft are nitro-carbonized treated.

5. The trailer hitch assembly of claim 1, further including:
   a first seal member positioned between the receiver portion and the hitch portion and configured to inhibit an entry of debris into the cavity of the receiver portion.

6. The trailer hitch assembly of claim 5, wherein the first seal member is received within the cavity of the receiver portion.

7. The trailer hitch assembly of claim 6, wherein the first seal member comprises a U-cup seal.

8. The trailer hitch assembly of claim 7, further including:
   a second seal member positioned between the receiver portion and the hitch portion and configured to inhibit an entry of debris into the cavity of the receiver portion.

9. The trailer hitch assembly of claim 8, wherein the second seal member is positioned between a rearward-facing surface of the receiver portion and the hitch portion.

10. The trailer hitch assembly of claim 9, further including:
    a first felt pack positioned between the receiver portion and the hitch portion substantially proximate the first seal member.

11. The trailer hitch assembly of claim 10, further including:
    a second felt pack positioned between the receiver portion and the hitch portion.

12. A trailer hitch assembly, comprising:
    a receiver portion adapted to operably couple with a towing vehicle and including a cylindrically-shaped cavity;
    a cylindrically-shaped bushing member received within the cavity of the receiver portion; and
    a hitch portion adapted to operably couple with a towed vehicle and including a cylindrically-shaped shaft pivotally received within the bushing member, wherein at least a selected one of the bushing member and the shaft at least in part comprises a material that substantially eliminates the need for using a separately applied lubricant during use of the trailer hitch assembly, and wherein the cavity of the receiver portion is defined in part by an inner wall, and wherein at least a select one of the wall of the cavity comprises a corrosion resistant material.

13. The trailer hitch assembly of claim 12, wherein at least a select one of the wall of the cavity and the shaft are nitro-carbonized treated.

14. A trailer hitch assembly, comprising:
    a receiver portion adapted to operably couple with a towing vehicle and including a cylindrically-shaped cavity;
    a cylindrically-shaped bushing member received within the cavity of the receiver portion; and, wherein the hitch portion includes a pintle hook assembly.

15. A trailer hitch assembly, comprising:
    a receiver portion adapted to operably couple with a towing vehicle and including a cylindrically-shaped cavity;
    a cylindrically-shaped bushing member received within the cavity of the receiver portion;
    a hitch portion adapted to operably couple with a towed vehicle and including a cylindrically-shaped shaft pivotally received within the bushing member, wherein at least a selected one of the bushing member and the shaft at least in part comprises a material that substantially eliminates the need for using a separately applied lubricant during use of the trailer hitch assembly; and
    a first seal member positioned between the receiver portion and the hitch portion and configured to inhibit an entry of debris into the cavity of the receiver portion.

16. The trailer hitch assembly of claim 15, wherein the first seal member is received within the cavity of the receiver portion.

17. The trailer hitch assembly of claim 15, wherein the first seal member comprises a U-cup seal.

18. The trailer hitch assembly of claim 17, further including:
a first felt pack positioned between the receiver portion and the hitch portion substantially proximate the first seal member.

19. The trailer hitch assembly of claim 15, further including:
a second seal member positioned between the receiver portion and the hitch portion and configured to inhibit an entry of debris into the cavity of the receiver portion.

20. The trailer hitch assembly of claim 17, wherein the second seal member is received between a forward-facing surface, the receiver portion and the hitch portion.

21. The trailer hitch assembly of claim 20, further including:
a second felt pack positioned between the receiver portion and the hitch portion.

22. A trailer hitch assembly, comprising:
a receiver portion adapted to operably couple with a towing vehicle; and
a hitch portion adapted to be operably coupled with the receiver portion and comprising:
a first jaw member;
a second jaw member pivotally coupled to the first jaw member, the second jaw member operable between a closed position, wherein the second jaw member cooperates with the first jaw member to form a closed loop, and an open position, wherein the first and second jaw members form an open loop;
a primary latch operably coupled with a select one of the first and second jaw members and operable between a locked position, wherein the primary latch abuts a portion of a select one of the first and second jaw members the primary latch is not operably coupled to and prevents the second jaw member from pivoting to the open position, and an unlocked position, wherein the second jaw member is able to pivot to the open position; and
a secondary latch operably coupled with the primary latch and operable between a locked position, wherein the secondary latch abuts a select one of the first and second jaw members and prevents the primary latch from being pivoted to the unlocked position, and an unlocked position, wherein the primary latch is able to pivot to the unlocked position thereof;
wherein the primary latch is operably coupled with the second jaw member, the primary latch operable between the locked position, wherein the primary latch abuts the first jaw member, and wherein the secondary latch is operable between the locked position, wherein the secondary latch abuts the second jaw member, and the unlocked position.

23. The trailer hitch assembly of claim 22, wherein the second jaw member is pivotally coupled to the first jaw member at a first pivot point, the primary latch is pivotally coupled to the second jaw member at a second pivot point that is located rearwardly and upwardly with respect to the first pivot point, and wherein the secondary latch is pivotally coupled with the second jaw member at a third pivot point that is located forwardly and upwardly with respect to the second pivot point.

24. The trailer hitch assembly of claim 23, wherein the first pivot point is defined by a first pivot pin, the second pivot point is defined by a second pivot pin, and wherein a force directed outwardly on the second jaw member from within the closed loop would cause structural failure of the second pivot pin prior to failure of the first pivot pin.

25. The trailer hitch assembly of claim 23, wherein the first jaw member includes a notch, and wherein an end of the primary latch is received within the notch of the first jaw member and the primary latch is in the locked position.

26. The trailer hitch assembly of claim 25, wherein the first jaw member includes a raised engagement surface, the primary latch includes a notch located along a length thereof, and wherein the engagement surface of the first jaw member is engaged within the notch of the primary latch when the primary latch is in the unlocked position, thereby retaining the second jaw member in the open position thereof.

27. A trailer hitch assembly, comprising:
a receiver portion adapted to operably couple with a towing vehicle; and
a hitch portion adapted to be operably coupled with the receiver portion and comprising:
a first jaw member;
a second jaw member pivotally coupled to the first jaw member, the second jaw member operable between a closed position, wherein the second jaw member cooperates with the first jaw member to form a closed loop, and an open position, wherein the first and second jaw members form an open loop;
a primary latch operably coupled with a select one of the first and second jaw members and operable between a locked position, wherein the primary latch abuts a portion of a select one of the first and second jaw members the primary latch is not operably coupled to and prevents the second jaw member from pivoting to the open position, and an unlocked position, wherein the second jaw member is able to pivot to the open position; and
a secondary latch operably coupled with the primary latch and operable between a locked position, wherein the secondary latch abuts a select one of the first and second jaw members and prevents the primary latch from being pivoted to the unlocked position, and an unlocked position, wherein the primary latch is able to pivot to the unlocked position thereof;
wherein the first pivot point is defined by a first pivot pin having a first load strength, the second pivot point is defined by a second pivot pin having a second load strength that is less than the first load strength.

28. The trailer hitch assembly of claim 27, wherein the first pivot pin and the second pivot pin are located with respect to one another such that failure of the second pivot pin causes the primary latch member to abut an inner stop wall of the second jaw member, thereby preventing the second jaw member from moving to a completely open position.

29. A trailer hitch assembly, comprising:
a receiver portion adapted to operably couple with a towing vehicle; and
a hitch portion adapted to be operably coupled with the receiver portion and comprising:
a first jaw member;
a second jaw member pivotally coupled to the first jaw member, the second jaw member operable between a closed position, wherein the second jaw member cooperates with the first jaw member to form a closed loop, and an open position, wherein the first and second jaw members form an open loop;

a primary latch operably coupled with a select one of the first and second jaw members and operable between a locked position, wherein the primary latch abuts a portion of a select one of the first and second jaw members the primary latch is not operably coupled to and prevents the second jaw member from pivoting to the open position, and an unlocked position, wherein the second jaw member is able to pivot to the open position; and a secondary latch operably coupled with the primary latch and operable between a locked position, wherein the secondary latch abuts a select one of the first and second jaw members and prevents the primary latch from being pivoted to the unlocked position, and an unlocked position, wherein the primary latch is able to pivot to the unlocked position thereof; and wherein the first jaw member includes a notch, and wherein an end of the primary latch is received within the notch of the first jaw member when the primary latch is in the locked position.

30. A trailer hitch assembly, comprising:

a receiver portion adapted to operably couple with a towing vehicle; and a hitch portion adapted to be operably coupled with the receiver portion and comprising:

a first jaw member;

a second jaw member pivotally coupled to the first jaw member, the second jaw member operable between a closed position, wherein the second jaw member cooperates with the first jaw member to form a closed loop, and an open position, wherein the first and second jaw members form an open loop;

a primary latch operably coupled with a select one of the first and second jaw members and operable between a locked position, wherein the primary latch abuts a portion of a select one of the first and second jaw members the primary latch is not operably coupled to and prevents the second jaw member from pivoting to the open position, and an unlocked position, wherein the second jaw member is able to pivot to the open position; and a secondary latch operably coupled with the primary latch and operable between a locked position, wherein the secondary latch abuts a select one of the first and second jaw members and prevents the primary latch from being pivoted to the unlocked position, and an unlocked position, wherein the primary latch is able to pivot to the unlocked position thereof; and wherein the first jaw member includes a raised engagement surface, the primary latch includes a notch located along a length thereof, and wherein the engagement surface of the first jaw member is engaged within the notch of the primary latch when the primary latch is in the unlocked position, thereby retaining the second jaw member in the open position thereof.

31. A trailer hitch assembly, comprising:

a receiver portion adapted to operably couple with a towing vehicle; and a hitch portion adapted to be operably coupled with the receiver portion and comprising:

a first jaw member;

a second jaw member pivotally coupled to the first jaw member, the second jaw member operable between a closed position, wherein the second jaw member cooperates with the first jaw member to form a closed loop, and an open position, wherein the first and second jaw members form an open loop;

a primary latch operably coupled with a select one of the first and second jaw members and operable between a locked position, wherein the primary latch abuts a portion of a select one of the first and second jaw members the primary latch is not operably coupled to and prevents the second jaw member from pivoting to the open position, and an unlocked position, wherein the second jaw member is able to pivot to the open position, and wherein the primary latch is biased in the locked position by a first spring member; and a secondary latch operably coupled with the primary latch and operable between a locked position, wherein the secondary latch abuts a select one of the first and second jaw members and prevents the primary latch from being pivoted to the unlocked position, and an unlocked position, wherein the primary latch is able to pivot to the unlocked position thereof.

32. The trailer hitch assembly of claim 31, wherein the first spring member comprises a coil spring.

33. The trailer hitch assembly of claim 32, wherein the second jaw member includes a locating stud located within an interior of the second jaw member, and wherein the stud positively positions the spring member.

34. The trailer hitch assembly of claim 31, wherein the secondary latch is biased in the locked position by a second spring member.

35. The trailer hitch assembly of claim 34, wherein the second spring member comprises a flat spring.

36. A trailer hitch assembly, comprising:

a receiver portion adapted to operably couple with a towing vehicle; and a hitch portion adapted to be operably coupled with the receiver portion and comprising:

a first jaw member;

a second jaw member pivotally coupled to the first jaw member, the second jaw member operable between a closed position, wherein the second jaw member cooperates with the first jaw member to form a closed loop, and an open position, wherein the first and second jaw members form an open loop;

a primary latch operably coupled with a select one of the first and second jaw members and operable between a locked position, wherein the primary latch abuts a portion of a select one of the first and second jaw members the primary latch is not operably coupled to and prevents the second jaw member from pivoting to the open position, and an unlocked position, wherein the second jaw member is able to pivot to the open position, and wherein the primary latch comprises powdered metal; and a secondary latch operably coupled with the primary latch and operable between a locked position, wherein the secondary latch abuts a select one of the first and second jaw members and prevents the primary latch from being pivoted to the unlocked position, and an unlocked position, wherein the primary latch is able to pivot to the unlocked position thereof.

37. A trailer hitch assembly, comprising:

a receiver portion adapted to operably couple with a towing vehicle; and a hitch portion adapted to be operably coupled with the receiver portion and comprising:

a first jaw member;

a second jaw member pivotally coupled to the first jaw member, the second jaw member operable between a closed position, wherein the second jaw member cooperates with the first jaw member to form a closed loop, and an open position, wherein the first and second jaw members form an open loop;

a primary latch operably coupled with a select one of the first and second jaw members and operable between a locked position, wherein the primary latch abuts a portion of a select one of the first and second jaw members the primary latch is not operably coupled to and prevents the second jaw member from pivoting to the open position, and an unlocked position, wherein the second jaw member is able to pivot to the open position; and a secondary latch operably coupled with the primary latch and operable between a locked position, wherein the secondary latch abuts a select one of the first and second jaw members and prevents the primary latch from being pivoted to the unlocked position, and an unlocked position, wherein the primary latch is able to pivot to the unlocked position thereof, and wherein the secondary latch includes at least one grippable handle extending outwardly therefrom and a graspable relief therein.

\* \* \* \* \*